J. A. Safford,
Splitting Leather.
No. 2,123. Reissued Dec. 5, 1865.
Fig; 1.
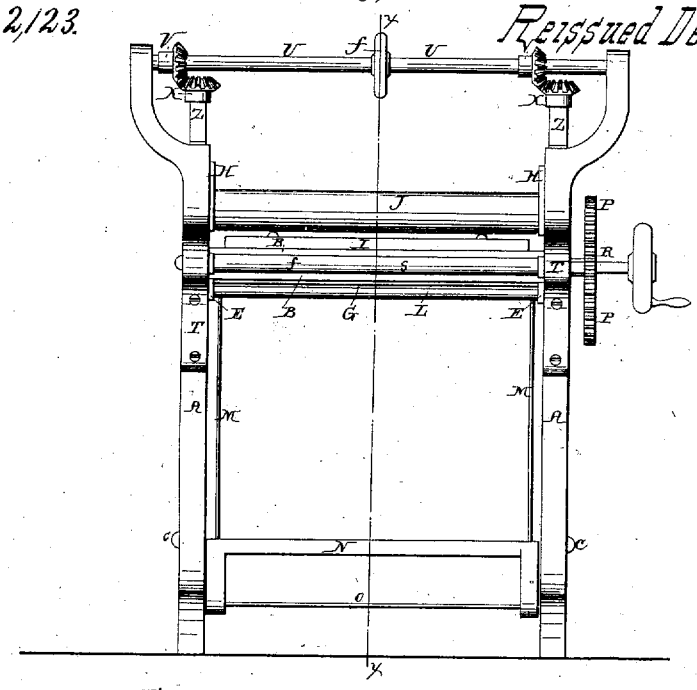
Fig; 2.
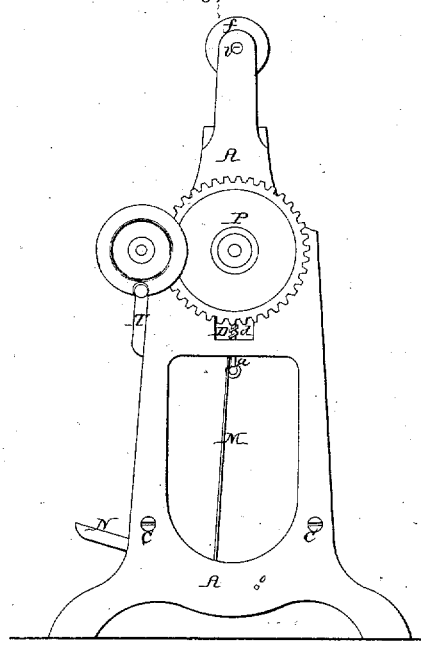
Fig; 3.
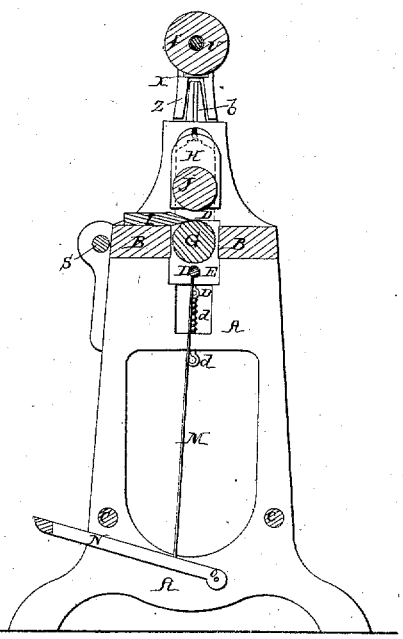
Witnesses;
Smain
John P. Jacobs
Inventor;
P. Hannay
Atty for J. A. Safford
N. PETERS, PHOTO-LITHOGRAPHER, WASHINGTON, D. C.

UNITED STATES PATENT OFFICE.

J. A. SAFFORD, OF BOSTON, MASSACHUSETTS.

IMPROVED MACHINE FOR SPLITTING LEATHER.

Specification forming part of Letters Patent No. 742, dated March 19, 1861; antedated November 19, 1860; Reissue No. 2,123, dated December 5, 1865.

*To all whom it may concern:*

Be it known that I, J. A. SAFFORD, of Boston, in the county of Suffolk and State of Massachusetts, have invented an Improved Machine for Splitting or Skiving Leather, &c.; and I do hereby declare that the following, taken in connection with the drawings which accompany and form part of this specification, is a description of my invention sufficient to enable those skilled in the art to practice it.

The invention relates to the construction of machines for splitting or skiving leather, the object being not only to insure in the operation of the machine the production of leather of perfectly uniform thickness, but to so construct the machine that it can be accurately and readily graduated or adjusted to the thickness of leather required.

In connection with a splitting-knife the machine employs a feed-roll for carrying the leather up to the splitting-knife, and a gage-roll which determines the thickness of the leather cut; and the invention consists in combining with the feed-roll, splitting-knife, and gage-roll a mechanism for simultaneously raising and depressing both ends of the gage-roll equally to insure rapid and accurate adjustment of the machine to the various thicknesses of leather which it may be desirable to split. also, in combining with the gage-roll having such means of adjustment, and the feed-roll, held up to the lower surface of the leather by springs, a mechanism which connects the feed-roll with a treadle in such manner that both its ends may be simultaneously depressed at the will of the operator.

The drawings represent a machine embodying the invention, Figure 1 showing a front elevation of it; Fig. 2, an end view, and Fig. 3 a vertical cross-section on the line *x x* of Fig. 1.

A A denote the standards of the machine supporting two bed-pieces, B, upon one of which the splitting-knife I is fixed, as seen in Fig. 3, while the other serves as a table or support to the leather as it is introduced to the action of the machine. The lower ends of the standards are connected by cross bars or rods C, the standards A, bed-pieces B, and cross bars C constituting the frame of the machine. In this frame are mounted the feed-roll G and gage-roll J, the journals on the opposite ends of which rotate, respectively, in bearings or boxes E H, which slide vertically in guide-slots D in the standards A. The feed-roll G has a roughened or toothed surface to insure the positive feed of the leather, and the roll is held in proper position with respect to the knife by springs *d*, which enable the roll to yield readily to inequalities in the thickness of the stock, and which at the same time keep the stock pressed between the feed-surface of the roll G and the knife I, so that the rotation of the roll G shall insure the progress of the leather to the action of the cutting-edge of the knife. The springs pass around rods *a a*, at the upper ends of which are adjusting-screws, which enter the bearing or boxes E and serve to adjust the position of the feed-roll with respect to the cutting-edge of the knife.

The bearings E are shown as connected by a cross-rod, L, and links M to a treadle, N, hung on a pivot-rod, *o*, the feed-roll being depressed by the treadle to enter the edge of the leather to be split between the feed-roll and knife, and to free the machine when choked, such depression in no way effecting in the latter case the position of the leather with respect to the gage-roll, the thickness of the skiving being graduated by the distance between the acting surface of the gage roll and the edge of the knife. This prevents any unevenness or inequality in the thickness of the leather as it comes from the machine in consequence of the position of the feed-roll.

It will readily be seen that while the springs *d* enable either end of the feed-roll to yield to inequalities in the stock, both ends may be simultaneously and equally depressed to introduce the leather or to free the machine when choked.

The feed-roll is driven by a driving-gear, R, on a shaft, S, meshing into a gear, P, on the feed-roll, as will be readily understood, the driving-shaft S being supported in suitable bearings or brackets I, projecting from the standards A. In the upper end of these brackets I are formed bearings for the support of a shaft, U, carrying near its opposite ends two bevel-pinions, V, which mesh into pinions X on vertical screw-shafts *b*, which shafts at their lower ends enter, and by rotation impart vertical motion to the bearings or boxes H of the gage-roll J, the screw-shafts being supported on stands Z at the top of the standards A. By rotation of the shaft U (through a hand-wheel, *f*, or otherwise) simultaneous rotation is imparted to the screw-shafts *b*, thereby simultaneously raising or depressing the boxes or bearings H and the opposite ends of the gage-roll J. In this mechanism applied to the gage-roll is contained the essence of my invention. When the opposite ends of the screw-shafts are adjusted separately or independently one from the other, it not only consumes much time to graduate the machine to the thickness of stock required, but it is very difficult to adjust the opposite ends of the gage-roll accurately, so as to obtain a perfectly uniform thickness across the leather in the direction of the length of the roll. By connecting the screws or other mechanism by which the height of each end of the gage-roll is determined and graduated together, so that the screws shall be simultaneously and equally rotated, these difficulties are overcome, and the operator is enabled to rapidly and accurately adjust the roll to the thickness of stock he wishes to obtain.

I claim—

1. In a machine for splitting leather having the narrow bed, stationary knife, feed-roll, and gage-roll disposed and co-operating in such manner as to adapt the machine to splitting leather, a provision for simultaneously raising and lowering the opposite ends of the gage-roll, substantially as described, to graduate the machine to the thickness of stock required.

2. Combining with the feed-roll when held in position to yield to the inequalities of the stock the means for simultaneously effecting the depression of its opposite ends, substantially as set forth.

In witness whereof I have hereunto set my hand this 2d day of October, A. D. 1865.

J. A. SAFFORD.

Witnesses:
J. B. CROSBY,
F. GOULD.